(No Model.)
H. C. YOCUM & M. V. KACER.
PROCESS OF MOLDING CIRCULAR GLASS ARTICLES.
No. 498,147. Patented May 23, 1893.
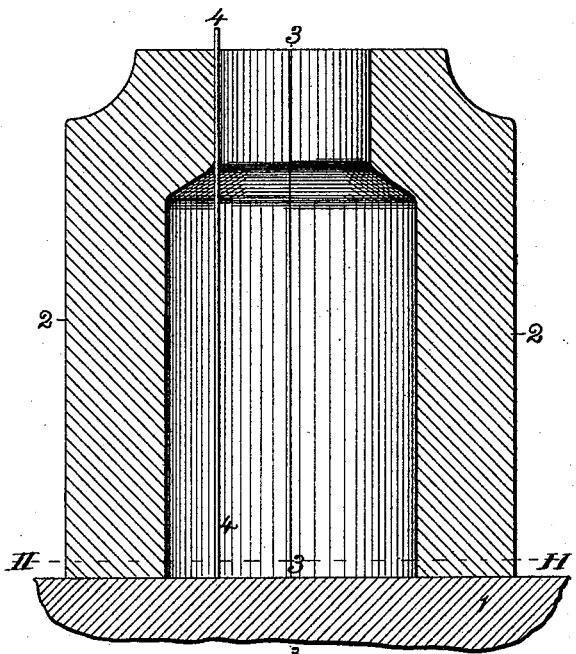
Fig. I.
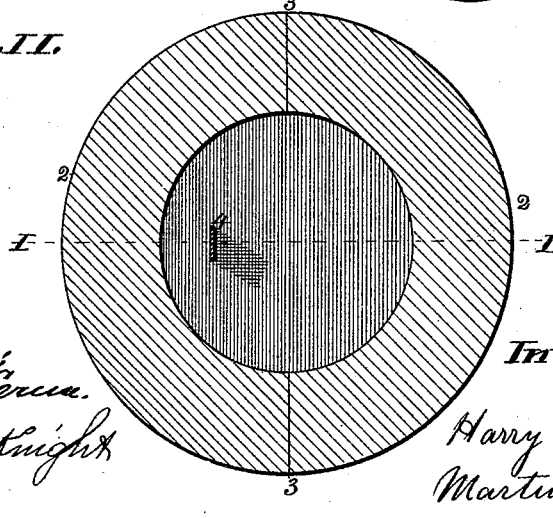
Fig. II.
Attest:
Geo. E. Cerua.
Edward B. Knight
Inventors:
Harry C. Yocum.
Martin V. Kacer.
By Knight Bros.
Attys.

UNITED STATES PATENT OFFICE.

HARRY C. YOCUM AND MARTIN V. KACER, OF ST. LOUIS, MISSOURI.

PROCESS OF MOLDING CIRCULAR GLASS ARTICLES.

SPECIFICATION forming part of Letters Patent No. 498,147, dated May 23, 1893.

Application filed May 28, 1892. Serial No. 434,784. (No specimens.)

*To all whom it may concern:*

Be it known that we, HARRY C. YOCUM and MARTIN V. KACER, both of the city of St. Louis, in the State of Missouri, have invented a certain new and useful Improvement in the Process of Molding Circular Glass Articles, of which the following is a full, clear, and exact description, reference being had to the accompanying drawings, forming part of this specification.

Molds for bottles and similar glass articles are made in halves or sections to close together. The meeting joints of the sections are not made sufficiently close as to prevent the formation of projecting seams at the joints. It is not new in the molding of circular articles of glass to turn or attempt to turn the article in the mold to smooth out the ribs formed at the joints but this cannot usually be done because of the adherence of the article to the mold. We have discovered that by the insertion of a thin strip of wood in the mold beside the article before the process of blowing the products of combustion from the burning of the wooden strip prevent the adhesion of the glass to the inside of the mold and allow the article to be turned.

Figure I is a vertical section of the mold, taken at I—I, Fig. II, showing the wooden strip in side elevation. Fig. II is a horizontal section of the mold and strip taken at II—II, Fig. I.

The mold may have any suitable construction. We have shown a base 1 and two similar sections 2 fitted together with a vertical joint 3.

4 is a thin strip of wood dropped into the mold either before or after the insertion of the glass ball from which the bottle or other circular article is to be formed. The heat of the glass causes the combustion of the wood. The products of combustion do not all escape from the mold, as they are not produced instantaneously, but are imprisoned in the space between the glass and the mold and though they do not prevent the article from taking the shape of the interior of the mold they prevent the adhesion of the glass to the mold so that when the blowing is completed, or during the process of blowing or after the blowing is completed, the article may be turned in the mold and any seams or ribs formed at the mold joints 3 smoothed out. The strip of wood is so completely burned up that no part remains intact.

We claim as our invention—

The process of molding circular glass articles which consists in the insertion of a strip of wood into the mold beside the glass ball, before blowing out the ball and turning the article within the mold, substantially as set forth.

HARRY C. YOCUM.
MARTIN V. KACER.

In presence of—
SAML. KNIGHT,
ED. S. KNIGHT.